United States Patent [19]

Benson

[11] Patent Number: 4,811,981
[45] Date of Patent: Mar. 14, 1989

[54] VEHICLE GLOVE COMPARTMENT ORGANIZER

[76] Inventor: Thomas E. Benson, 17A Orchard Dr., Olney, Ill. 62450

[21] Appl. No.: 159,207

[22] Filed: Feb. 23, 1988

[51] Int. Cl.$^4$ .............................................. B60R 7/06
[52] U.S. Cl. .................................. 296/37.12; 108/92; 312/333
[58] Field of Search ..................... 296/37.12; 312/333, 312/128; 108/92; 211/175

[56] References Cited

U.S. PATENT DOCUMENTS

| | | | |
|---|---|---|---|
| 1,458,356 | 6/1923 | O'Kane | 296/37.12 |
| 1,617,799 | 2/1927 | Emanuel et al. | 312/128 |
| 2,226,434 | 12/1940 | Hirsh | 296/37.12 |
| 2,820,687 | 1/1958 | Waring | 312/350 |
| 4,099,814 | 7/1978 | Hasselberger | 296/37.12 |
| 4,445,720 | 5/1984 | Leaf et al. | 296/37.12 |

Primary Examiner—Robert B. Reeves
Assistant Examiner—Brian Sells
Attorney, Agent, or Firm—Warren D. Flackbert

[57] ABSTRACT

A vehicle glove compartment organizer characterized by a body in the form of two shelf portions slidable with respect to each other for accommodating differences in width and/or the use of space in the glove compartment. The top of the shelf portions of the organizer may be spaced from the top of the glove compartment to provide a storage area together with storage compartments presented by each of the shelf portions. The support wall for each of the shelf portions tapers downwardly and rearwardly so that the aforesaid storage area and storage compartments are inclined to prevent unwanted forward storage item movement, where the storage items could include a tire gauge, pens, pencils, and the like, in addition to flat items, such as maps.

1 Claim, 4 Drawing Sheets

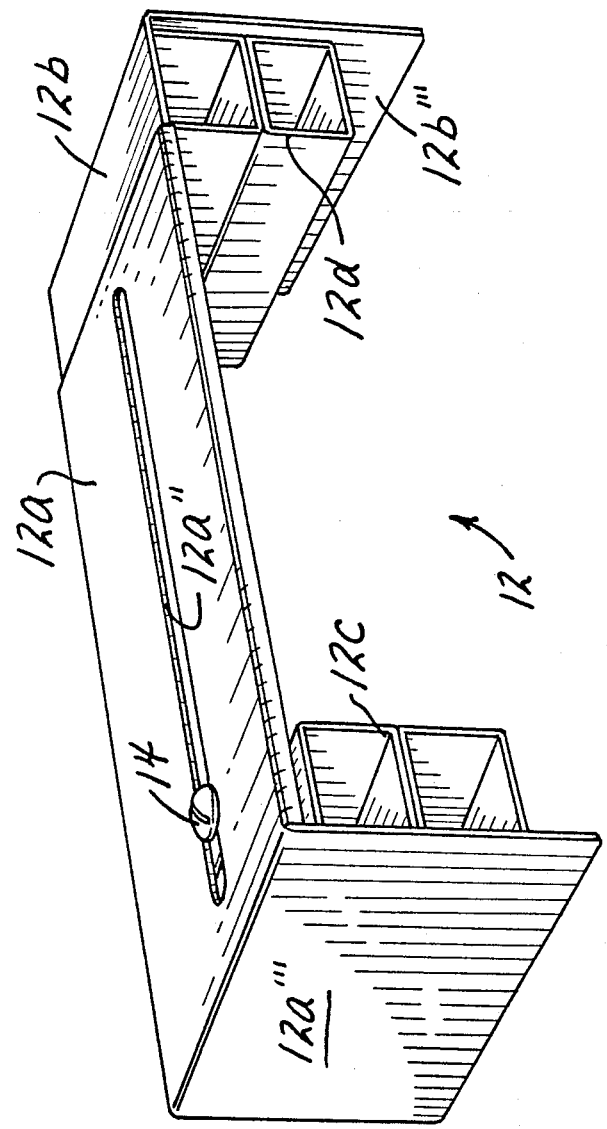

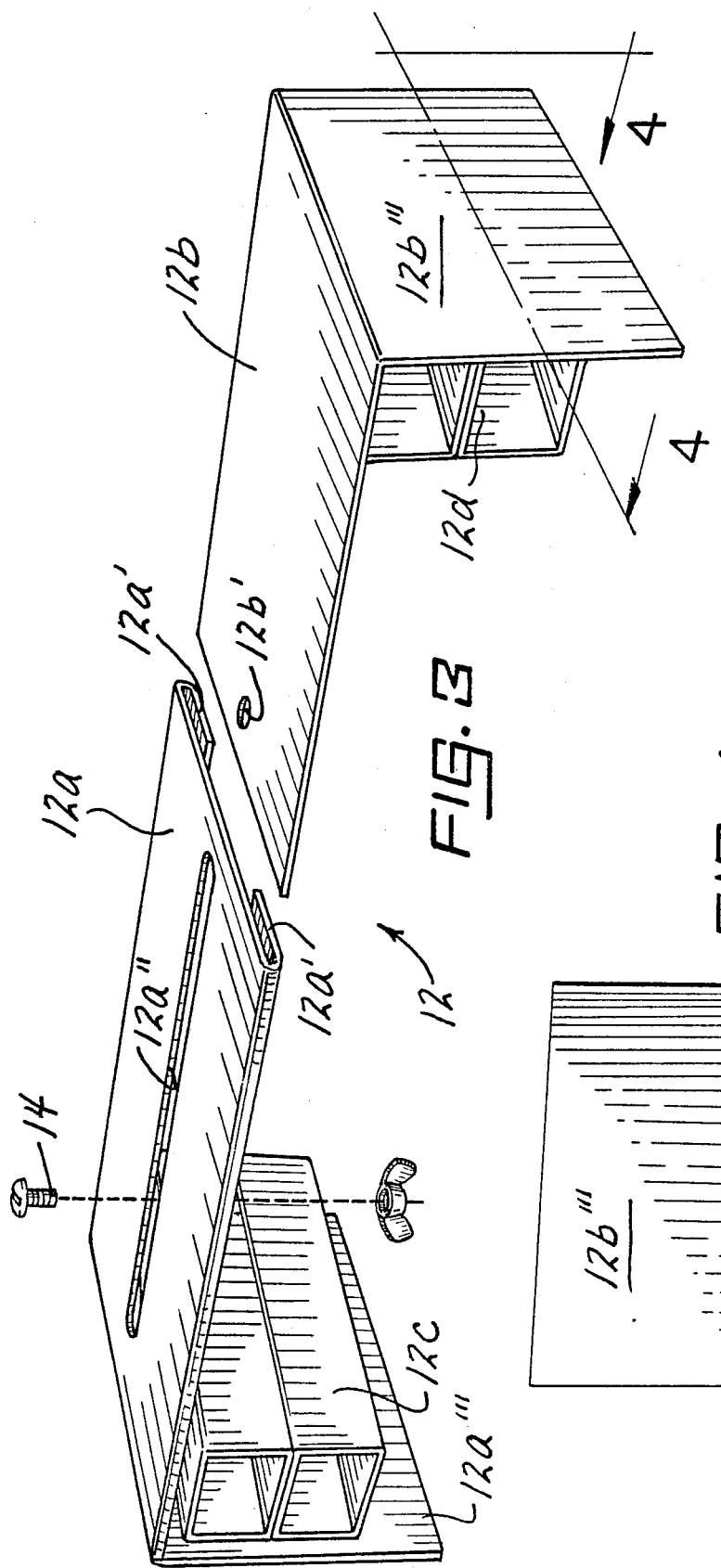

VEHICLE GLOVE COMPARTMENT ORGANIZER

As is known, glove compartments provided in vehicles, such as automobiles and trucks, receive a variety of items useful for the vehicle operator/traveler, including, by way of example, maps, pens, tire gauges, small tools and the like. Usually, however, the preceding involves a cumbersome effort for specific item retrieval, i.e. oftentimes requires extensive search effort, removal of certain items to locate another item, or whatever. In any event, the preceding represents a user inconvenience.

The invention overcomes the aforesaid problems in presenting an organizer adaptable to be introduced within a vehicle glove compartment, where such includes a selectively usable shelf area and partitioned compartments for receiving, for storage, desired items. In a preferred form, the organizer, formed from a common plastic resin, is defined by two portions, slidable with respect to each other, to satisfy, for example, glove compartment width requirements. Additionally, the organizer, in a use condition, is inclined downwardly, from front to back, such serving, thereby, to limit any unwanted item movement from the organizer when the glove compartment door is opened.

In any event, a better understanding of the present invention will become more apparent from the following description, taken in conjunction with the accompanying drawings, wherein FIG. 1 is a perspective view in front elevation, showing an organizer in accordance with the teachings of the present invention, where a typical glove compartment is represented by phantom lines;

FIG. 2 is another perspective view of the instant vehicle glove compartment organizer, after assembly but prior to glove compartment placement;

FIG. 3 is another perspective view of the invention showing such in an exploded relationship prior to assembly;

FIG. 4 is a view in end elevation, looking in the direction of the arrows on FIG. 3, detailing the rearwardly and downwardly slanting side walls presented by the organizer; and, FIG. 5 is of still another perspective view, but looking upwardly onto the organizer.

Figure 1:
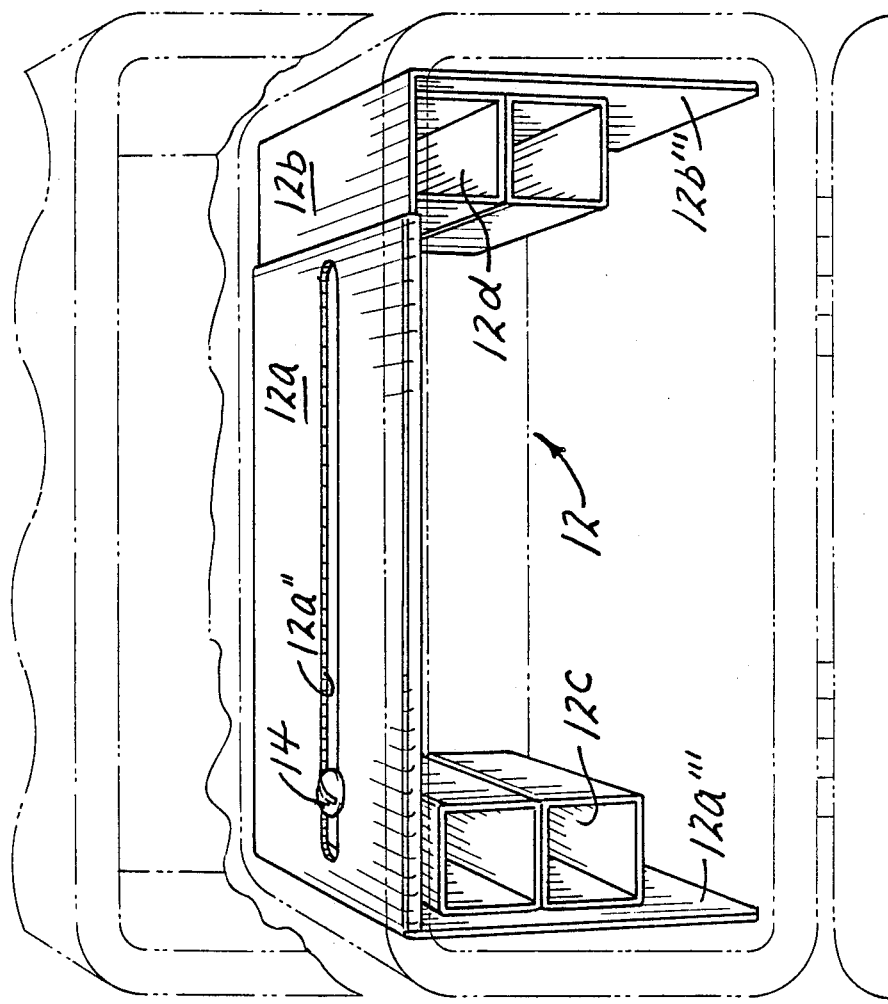
Figure 5:
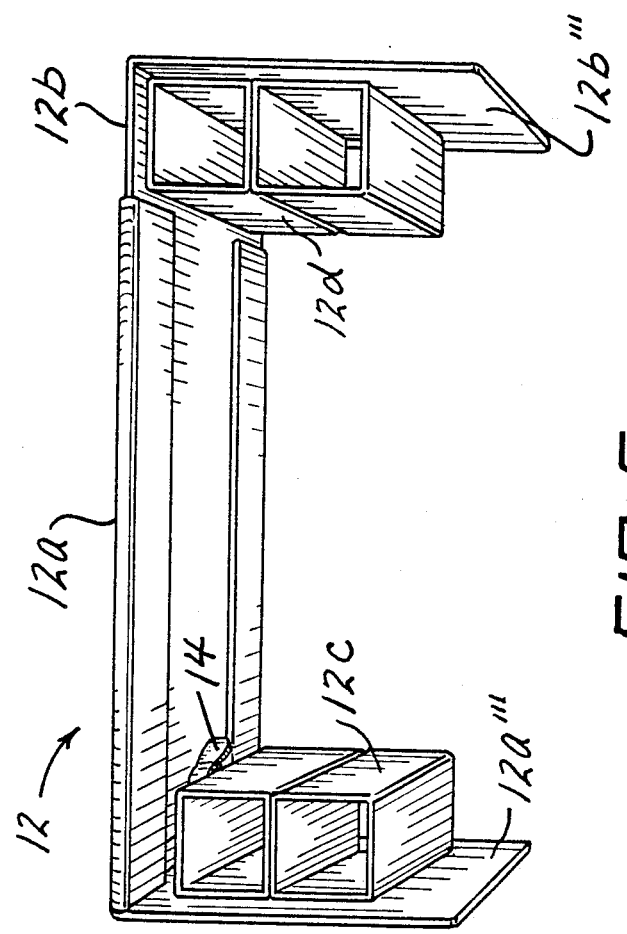

For the purposes of promoting an understanding of the principles of the invention, reference will now be made to the embodiment illustrated in the drawings and specific language will be used to describe the same. It will nevertheless be understood that no limitations of the scope of the invention is thereby intended, such alterations and further applications of the principles of the invention as illustrated therein being contemplated as would normally occur to one skilled in the art to which the invention relates.

Referring now to the figures, the organizer presented by the invention is defined by a body 12 in the form of two shelf portions 12a and 12b slidable with respect to the other to accommodate the spacing requirements, i.e. the inner width, of a vehicle glove compartment (shown in phantom).

As particularly evident in FIGS. 3, the top of shelf portion 12a includes inwardly extending longitudinal edges 12a' along either side thereof, serving to provide spaces for receiving the longitudinal edges of the top of shelf portion 12b. The margins provided by the inturned edges also serve stability purposes upon organizer assembly.

The top of shelf portion 12a also includes a longitudinal slot 12a'', where an opening or a hole 12b' in the top of shelf portion 12b travels therebeneath, i.e. so that a nut and wing bolt combination 14 can secure, upon tightening, the shelf portions 12a and 12b together at any preselected position.

Each of the shelf portions 12a and 12b present a usable storage area on the tops thereof, as for maps or the like, and also include article receiving compartments 12c and 12d, as in a vertically stacked relationship. Importance lies (apparent in FIG. 4) in the fact that end or support walls 12a''' and 12b''' for each of the shelf portions 12a and 12b taper rearwardly and downwardly, i.e. so that the usable top storage area and/or the compartments 12c and 12d retain stored articles without any unwanted movement in the event of glove compartment door opening.

Thus, as should be evident, the organizer presented herein is capable of ready placement by the positive assembled relationship existing between shelf portions 12a and 12b. Usage of the organizer is versatile, i.e. such can utilize all glove compartment space, with map storage, for example, being beneath and between the compartments 12c and 12d and/or the usable storage area on the tops of the shelf portions 12 and 12b utilized for map or flat item storage, i.e. the organizer only partly using the available vertical glove compartment storage space.

As stated, the organizer is typically formed from a common plastic resin, meaning durability in use and, as well, ready maintenance, where color may be coordinated with that of the interior color(s) of the vehicle.

The organizer described hereabove is susceptible to various changes within the spirit of the invention, including, by way of example, in proportioning; the number of compartments provided; the arrangement of assembling the slidable shelf portions; material selection; the angle and/or degree of slant from the front to the rear of the organizer; and, the like. Thus, the preceding should be considered illustrative and not as limiting the scope of the following claims:

I claim:

1. A storage item organizer for use within the cavity of a vehicle glove compartment having end walls, a back wall and top and bottom walls comprising a body defined by a first shelf portion and a second shelf portion slidable with respect to each other, means selectively fastening said first shelf portion and second shelf portion together at a position accommodating spacing between said end walls of said cavity, and a support member for said first shelf portion and said second shelf portion disposed on said bottom wall of said cavity, said support member inclining said organizer downwardly and rearwardly to prevent unwanted forward movement of a storage item, where said first shelf portion includes a storage compartment in a spaced apart relationship with the top wall thereof, where the top wall of said second shelf portion selectively extends within said space to said position accommodating spacing between end walls of said cavity, where said fastening means extends through cooperating cut-out areas in said first shelf portion and said second shelf portion, and where the top surfaces of said first shelf portion and said second shelf portion are in a spaced apart relationship with respect to said top wall of said cavity.

* * * * *